United States Patent [19]
Kitterman

[11] 3,959,419
[45] May 25, 1976

[54] VAPOR-LIQUID CONTACT METHOD
[75] Inventor: Bedford L. Kitterman, Lakewood Village, Tex.
[73] Assignee: Fritz W. Glitsch & Sons, Inc., Dallas, Tex.
[22] Filed: Sept. 6, 1973
[21] Appl. No.: 394,838

[52] U.S. Cl. .................................. 261/98; 55/90; 55/233; 261/112
[51] Int. Cl.² .................. B01D 47/16; F02M 17/28
[58] Field of Search .............................. 261/94–98, 261/108–113; 55/233, 90

[56] References Cited
UNITED STATES PATENTS

| | | | |
|---|---|---|---|
| 860,753 | 7/1907 | Lloyd | 261/96 |
| 1,578,687 | 3/1926 | Sperr Jr. | 261/98 |
| 1,649,345 | 11/1927 | Gilmore | 261/98 |
| 1,715,252 | 5/1929 | Sperr Jr. | 261/98 |
| 2,055,162 | 9/1936 | Weber | 261/98 |
| 2,253,261 | 8/1941 | Bacon | 261/94 |
| 3,079,134 | 2/1963 | Winn | 261/113 |
| 3,343,821 | 9/1967 | Winn et al. | 261/112 |
| 3,739,551 | 6/1973 | Eckert | 55/90 |

FOREIGN PATENTS OR APPLICATIONS

| | | | |
|---|---|---|---|
| 646,455 | 8/1962 | Canada | 261/94 |

*Primary Examiner*—Bernard Nozick
*Attorney, Agent, or Firm*—Joseph H. Scheley; Thomas L. Cantrell

[57] ABSTRACT

Vapor-liquid contact methods wherein the vapor and liquid are subjected to one or more contact zones having contiguous grids and bulk packing so as to obtain optimum pressure drop characteristics, surficial area, vapor passage area, structural rigidity and vapor-liquid distribution characteristics with maximum economical efficiency, the grid configuration being utilized to confine and/or support the bulk packing so as to minimize displacement thereof as well as functioning to fractionate, separate, or effect other mass and/or energy transfer reactions between the liquid and vapor in conjunction with said bulk packing.

2 Claims, 5 Drawing Figures

VAPOR-LIQUID CONTACT METHOD

BACKGROUND OF THE INVENTION

In the vapor-liquid contact art, it is highly desirable to utilize methods and means that efficiently improve the quality as well as the quantity of the end products without increasing reflux rates or by the uneconomical use of introduced utilities, such as steam. Close fractionation and/or separation of the feed stock constituents and the elimination of harmful or undesirable residual elements, such as solids, conradson carbon and metals which are present in many chemical and petroleum feed stocks, as well as for purity are essential. Mass transfer, heat transfer, fluid vaporization and/or condensation, whereby one of the fluids can be cooled with a minimum pressure drop through and in a particular zone or zones of minimum dimensions defining the area and volume thereof, are additional prerequisites of efficient operation.

In the vapor-liquid contact art there are three basic fundamental process situations normally involved:

1. The superficial flow rate or mass of the vapor decreases as it ascends through a vapor-liquid contact vessel or a portion thereof;
2. The superficial flow rate or mass of the vapor increases as it ascends through a vapor-liquid contact vessel or a portion thereof; and
3. The vapor mass remains substantially constant without any significant fluctuation as it ascends through a vapor-liquid contact vessel or a portion thereof.

Illustrative practical cases of the three basic process situations are: (a) a vacuum tower in a petroleum refinery for situation 1; (b) a quench column or a desuperheater for situation 2; and (c) a fractionator operating under high vacuum for situation 3.

The methods and apparatus of the present invention find application in all three of the basic process situations listed above. In the detailed description which follows, the invention will be disclosed and discussed primarily in the context of the first situation, and its application to the other two situations will be briefly summarized for those skilled in the art.

For the many types of continuous separation processes incorporating the use of both concurrent and countercurrent vapor-liquid contact, it is desirable to utilize equipment that yields maximum through-put capacity and maximum vapor-liquid exchange efficiency while maintaining minimum pressure drop between the vapor feed stock inlet and the top overhead discharge of the vapor-liquid contact vessel.

Vapor-liquid contact efficiency is directly related to the superficial vapor energy, because the vapor energy creates intimate vapor-liquid contact by turbulence and/or mixing between the ascending vapor and the descending liquid through the height of a given contact zone. If the vapor energy is too low, the efficiency per foot of zone is low and a greater height of the zone, together with increased tower height, is required to achieve the separation or the desired function in said zone. This increases the capital cost of the equipment and furthermore can result in an undesirable increase in pressure drop through the height of the contact zone.

Vapor-liquid contact apparatus must have sufficient surficial and surface contact area to encourage intimate vapor-liquid contact without unduly restricting the flow of the ascending vapor or its countercurrent contact with the descending liquid. The greater the distance the ascending vapor must traverse in a particular contact apparatus of a given configuration, with its flow area obstructions to the flow of said ascending vapor, the greater the pressure drop through the apparatus will be for a given vapor rate.

For many services, and more particularly in vacuum service, very low pressure drop is desired. In addition, a high pressure drop through a given vapor-liquid contact apparatus reduces the capacity of the contact apparatus, since an increase in the vapor rate through-put with an accompanying and undesirable or excessive increase in pressure drop causes a hold-up of the descending liquid, and results in said apparatus flooding because it can no longer accept a desired increase in said vapor rate due to the vapor capacity having been reached and exceeded. The preceding also applies to descending liquid flow rates because a pressure drop point is reached which results in flooding of the contact apparatus since its liquid capacity has then been reached and exceeded.

Various means have been developed in this art in an effort to obtain greater capacity at the price of a sacrifice of efficiency, or greater efficiency at the price of a sacrifice of capacity. For those means known in the art which produce maximum capacity, not only is efficiency sacrificed or capital investment greatly enlarged by increased vessel height and/or diameter, but also the range of operation is materially narrowed between the capacity flood point and a minimum through-put rate that might be desired. This is a considerable disadvantage because many fractionating or vapor-liquid contact systems are required, by market or seasonal conditions, to operate at reduced rates well below the designed maximum operating rate.

In the vapor-liquid contact art, bulk packing, such as Raschig rings and saddles, has been used to obtain desirable efficiency values resulting from surficial obstructions and tortuous vapor paths for the ascending feed stock vapor. Bulk packing with its lower capacity requires a larger diameter tower to obtain the maximum through-put capacity commensurate with good separation efficiency. Random bulk packing in the bed height and diameter normally required is subject to and encourages poor ascending vapor distribution or descending liquid distribution, resulting in the channelling and/or bypassing of ascending vapor and/or descending liquid with little or not contact. Bulk packing positioned in place in a preselected pattern magnifies the problem of poor vapor-liquid distribution as well as producing a loss in efficiency due to the lack of turbulence by vapor-liquid passage streamlining. Furthermore, in certain types of service such maldistribution of the vapor and liquid causes coking or plugging of the bulk packing because of areas of quiescence and/or lack of turbulence.

It is noted that the prior art, namely, Winn and Winn et al. U.S. Pat. Nos. 3,079,134 and 3,343,821, discloses vapor-liquid contact apparatuses having large vapor and liquid passage areas to ensure proper comingling and contact of ascending vapors with descending liquid substantially throughout the entire volume occupied by the grid beds. In addition, these disclosures provide grids of substantial structural strength to minimize the use of auxiliary supports in vapor-liquid contact towers and said grids, with their excellent vapor-liquid mixing characteristics and controlled turbulence of vapor and liquid, greatly increase the through-put capacity and thereby permit the use of smaller towers with lower pressure drop than can be accomplished with random bulk packing material.

The vapor-liquid contact grids of these disclosures share, to some extent, a characteristic common to contact grid generally. At low vapor rates, their efficiency drops off, which limits the practical minimum through-put rate to a relatively high value.

SUMMARY OF THE INVENTION

In accordance with the method of the invention vapor-liquid contact operations are effected in zones containing both contact grid elements and bulk packing elements. Each zone has two major contiguous regions, one of grids and one of bulk packing. The ascending vapor is brought into contact with one region in the zone before coming into contact with the other; which region is contacted first depends on which of the three basic process situations outlined above obtains in the zone.

Another method aspect of the invention involves directing both the liquid and the vapor entering the bulk packing region of a zone, whether the entrance is from the grid region or from another part of the vessel, through at least a thin grid bed prior to admission to the bulk packing region. (In the instance where entrance is from the grid region of the zone, the grid region itself performs this function, and no separately identifiable thin grid bed is required. Conceptually, the portion of the grid region adjacent the bulk packing region may be regarded as the above mentioned "thin grid bed".) This procedure inproves the distribution of the liquid and vapor streams entering the bulk packing region, and goes a long way toward eliminating a major drawback of bulk packings, that of channelling and bypassing.

A major operational advantage of the method of the invention, explained in greater detail below, is an increase in flexibility of operation, because the contact zone contains elements which are efficient at high vapor rates and elements which are efficient at low vapor rates. Other operational advantages are detailed below.

In accordance with the apparatus aspects of the invention the grid regions and thin grid beds are arranged contiguously with the bulk packing regions of the zone and function as support and hold-down devices for the packing. The principal advantage is a capital one: Tower space which is occupied by equipment which is merely structural hardware costs just as much per cubic foot as tower space containing equipment which effectuates the vapor-liquid contact process. Yet the tower space containing the structural hardware contributes nothing toward the process itself. By eliminating the hardware, as the invention does, the accompanying tower space can be eliminated, and the capital investment in the tower reduced.

In this connection, it should be noted that traditionally, bulk packing has been supported on perforated plates or trays, and has been held down by overlying screens, both of which occupy tower space but contribute nothing operationally.

In accordance with another apparatus aspect of the invention, an improved treatment zone is provided for installation in a treating vessel, comprising a spray header positioned above a contact grid, either in a thin bed or a grid region, a pair of contiguous contact regions, one bulk packing and one contact grid, the regions terminating at the bottom with at least a thin bed of contact grid, either as part of the grid region or separately, beneath which is positioned a collector tray for gathering liquid descending from the zone and admitting vapor into the zone.

Other advantages flowing from the apparatus aspects of the invention are listed in detail below.

The more important advantages of the invention may be summarized as follows:

A saving in capital cost of equipment may be effected. Smaller diameter towers or vessels of lesser height may be utilized because:

1. Grid type vapor-liquid contact structures accept high vapor loads with low pressure drop and good efficiency.
2. Bulk packing material in contiguous and proper functional relationship with grid structures maintains good efficiency without impairment of capacity.
3. Grid structures having good inherent structural rigidity and weight carrying ability support bulk packing material sections and prevent comingling of bulk packing with grid section.
4. Grid structures retain bulk packing material and maintain uniform bed height with the advantages of correcting maldistribution of vapor through said bulk packing material and uniformly distributing descending liquid into said material.
5. Tower height is minimized because grid structures support the bulk packing materal and thereby eliminate the necessity for separate supporting members as well as for additional tower height to provide adequate volumetric space between spaced grid and bulk packing zones to reestablish uniform vapor distribution with respect to velocity and pressure drop.

The operational features of advantages of the invention include:

1. The velocity and kinetic energy of the vapor is utilized at values well within a maximum or minimum value of either, to prevent unstable or difficult to control operation and to provide desired pressure drop values without introducing extraneous or parasitic pressure drop by the necessary use of maximum or minimum velocity and kinetic energy values.
2. A vapor-liquid contact system is provided wherein the pressure drop between the feed stock inlet and the discharge outlet may be maintained at a low and stable value.
3. One or more composite grid bed and bulk packing zones are employed to obtain desired efficiency and through-put capacity and to eliminate the necessity for a multi-diameter vessel which usually is required by other vapor-liquid contact apparatus known to the art.
4. One or more composite grid and bulk packing zones are employed to provide maximum efficiency, maximum capacity and minimum pressure drop under maximum operating conditions while also maintaining good efficiency when operations are at a significantly lower vapor and/or liquid rate without impairing the desired pressure drop value or stability of operation; this capability is normally referred to as a good turn-down ratio, and is very desirable since market conditions and/or seasonal demands may require operation at significantly lower rates.

5. A vapor-liquid contact system is provided utilizing composite grid bed and bulk packing zones in combination with spray header systems and collector trays.

OBJECTS OF THE INVENTION

It is one object of the invention to provide improved vapor-liquid contact methods utilizing one or more composite grid bed and bulk packing zones comprising grids and bulk packing in contiguous relationship whereby grid configurations of the type disclosed in the Winn and Winn et al patents, supra, may be used in defined conjunction with packing material, such as Raschig rings, saddles or other types.

Another object of the invention is to provide improved vapor-liquid contact methods wherein pressure drop characteristics, surficial area, vapor passage area, structural rigidity and vapor-liquid distribution characteristics of composite grid bed and bulk packing zones can be utilized to maximum efficiency.

Another object of the invention is to provide improved methods of the character described wherein novel composite grid bed and bulk packing zones are employed whereby the advantages of both grid bed and bulk packing means are maximized and the disadvantages thereof are minimized.

Another object of the invention is to utilize grid bed structures as primary or secondary supports for bulk packing and, which due to their configuration, confine the bulk packing material in its proper relative location and furthermore prevent or minimize the comingling of said material with the grid members in a particular composite grid bed and bulk packing zone.

Another object of the invention is to provide novel vapor-liquid contact systems having one or more composite grid bed and bulk packing zones so as to effect savings in capital cost of equipment by utilizing the teaching of the invention to minimize the overall diameters and heights of the contact vessels or towers by reducing grid bed zone diameter and height as well as the volume of space required for bulk packing supports and multiplicity of vessel or tower diameters.

Another object of the invention is to provide improved vapor-liquid contact systems wherein one or more composite grid bed and bulk packing zones are utilized to obtain maximum efficiency of operation and maximum capacity of vapor and liquid through-put of the contact vessels or towers.

Another object of the invention is to provide, in combination with the grid beds of the various composite zones, a spray header arrangement for equal distribution of the liquid reflux over the area of each grid bed zone and, in combination, to provide a novel collector tray arrangement for a particular composite grid bed and bulk packing zone or zones or in conjunction with separate grid beds and/or bulk packing zones.

Another object of the invention is to provide novel composite grid bed and bulk packing zones wherein the excellent vapor and liquid distribution characteristics of grid bed structures are utilized to minimize the poor vapor and liquid distribution characteristics of bulk packing.

Another object of the invention is to provide an improved composite grid bed and bulk packing zone wherein the sections of the composite zone may be arranged to efficiently and economically meet process requirements when the vapor rate is decreasing or increasing through said composite zone or said vapor mass remains constant.

VAPOR-LIQUID CONTACT APPARATUS WHEREIN THE SUPERFICIAL FLOW RATE OR MASS OF THE VAPOR DECREASES AS IT ASCENDS THROUGH THE APPARATUS

Figure 1:
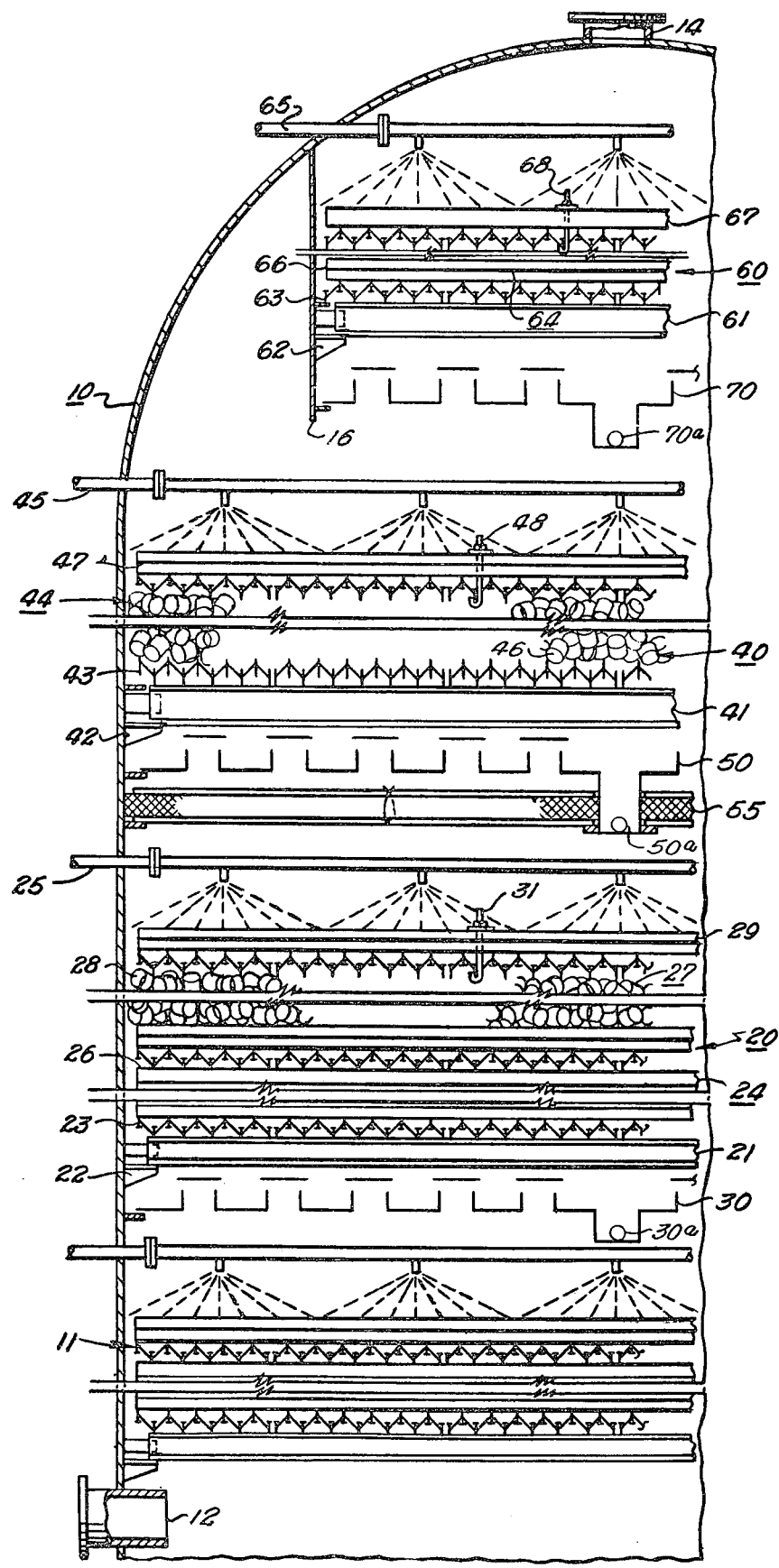
FIG. 1 is a fragmentary schematic vertical sectional view of a portion of a vapor-liquid contact tower or vessel constructed in accordance with the invention.

FIG. 1 illustrates a portion of a vapor-liquid contact tower or vessel having at least one composite grid bed and bulk packing zone 20, one or more intermediate zones 40 of bulk packing material, an upper or top grid bed zone 60, conventional spray header systems 25, 45, 65 overlying the zones, collector trays 30, 50, 70 underlying said zones and a mist eliminator 55 underlying the zone 40 and its collector tray 50. Each collector tray has a sump and drawoff line 30a, 50a, 70a. Liquid may be drawn off through such lines for further processing or storage, or for reintroduction to the tower through suitable distributor means at any desired point in the tower. A wash oil zone 11, consisting of contact grids, is mounted in tower 10 below zone 20. The tower 10 has an inlet 12 in its lower portion and a discharge outlet 14 in its upper end or dome. Relatively large support beams 21, 41, 61 extend transversely of the tower beneath the zones and the ends of the beams 21 and 41 may be secured to the wall of said tower by suitable bracket means 22 and 42 respectively. For enclosing the top zone 60, an annular skirt 16 depends from the dome or upper end of the tower 10 and has inwardly projecting bracket means 62 intermediate its upper and lower margins for connecting the beam 61 thereto. At least one row or tier 23, 43, 63 of grid members or panels, preferably of the type shown in the Winn and Winn et al patents, supra, rest upon each of the respective beams 21, 41, 61 and form bottoms or supports for said zones, reference being made to said patents for detailed descriptions of the grid members or panels.

Figure 2:
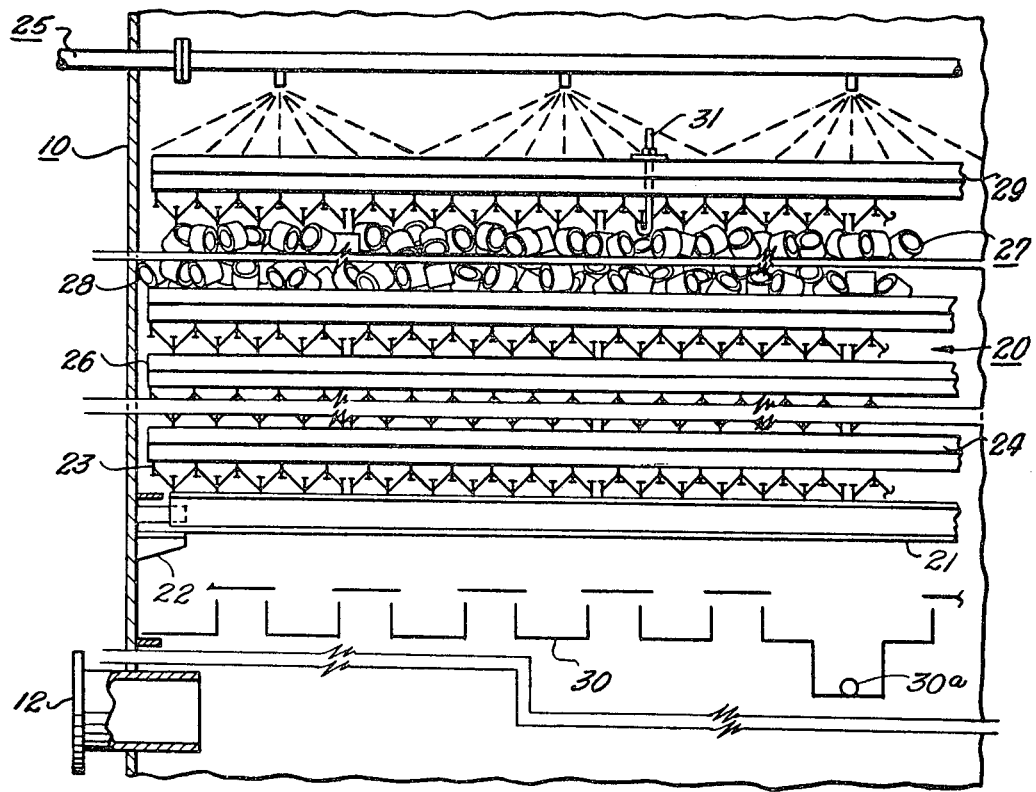
FIG. 2 is an enlarged fragmentary schematic vertical sectional view of a portion of the lower composite grid bed and bulk packing zone of the vapor-liquid contact tower shown in FIG. 1.

As best shown in FIG. 2, the composite zone 20 comprises a bed or section 24 of the aforesaid type of grid members or panels arranged in layers or tiers 26 with adjacent tiers in angular relationship and with the lowermost layer or tier of the bed or section being formed by the aforesaid bottom or support 23 of grid members or panels. A bed 27 of bulk packing rests upon the grid bed or section 24 in contiguous relationship and, as shown by the numeral 28, the bulk packing may be in the form of Raschig rings or of any other suitable type of discrete elements, such as saddles, reference being made to U.S. Pat. Nos. 2,639,909, and 3,266,787 for typical structures utilized for this purpose. For confining the bulk packing 28 against displacement, a unitary holddown assembly 29 rests upon the bed 27. It has at least one, and preferably two or more tiers or rows of the aforesaid grid members or panels. When a plurality of tiers are employed, they may be secured by a plurality of J-bolts 31.

As is disclosed in the Winn et al. patent, each of the layers or tiers 26 may include a plurality of elongate upright portions extending transversely of the vessel 10. These elongate portions are substantially parallel and may be disposed in spaced, alternate offset, or staggered relationship so as to generally upstand and depend with the lower margins of the upstanding portions in or near transverse alignment with the upper margins of the depending portions. A plurality of inclined elements spatially connect these portions to one another. Also, substantially coextensive flanges may be formed on the lower and upper margins, respectively, of the elongate portions to provide upwardly and downwardly directed surfaces of amplified magnitude. Manifestly, these surfaces could be formed in various manners, such as by the connecting means.

Again referring to FIG. 1, the intermediate bulk packing zone 40 includes a bed 44 consisting of a multiplicity of discrete packing material 46, such as Raschig rings, resting on the grid support 43 and an overlying holddown assembly 47, substantially identical to the assembly 29, for confining the packing material against displacement. J-bolts 48 may secure its tiers or rows together. As shown, the holddown assembly 47 may be substantially identical to the assembly 29 or of modified configuration. The top grid bed zone 60 is similar to the grid bed 24 of the zone 20 in that it includes a bed 64 of the aforesaid type of grid members or panels arranged in layers or tiers 66 with adjacent tiers in angular relationship. A holddown assembly 67, substantially identical to assemblies 29 and 47 and having its layers secured by J-bolts 68, rests upon and is supported by the grid bed 64. It is noted that the grid support 43 is illustrated as being of modified configuration and that any of the grid beds 24, 60 and holddown assemblies 29, 47, 67 as well as the supports 23, 63 also could be modified.

For desirable maximum vapor feed stock rate, the maximum capacity of a grid section or a bulk packing section of a given diameter can be determined from plotted curves (FIG. 3) relative to various descending liquid rates expressed in gallons per minute per square foot of tower area and a capacity factor equal to the superficial vapor velocity times the square root of the quotient of said vapor density divided by the difference in the descending liquid density and said vapor density. The superficial vapor velocity is expressed in feet per second.

Figure 3:
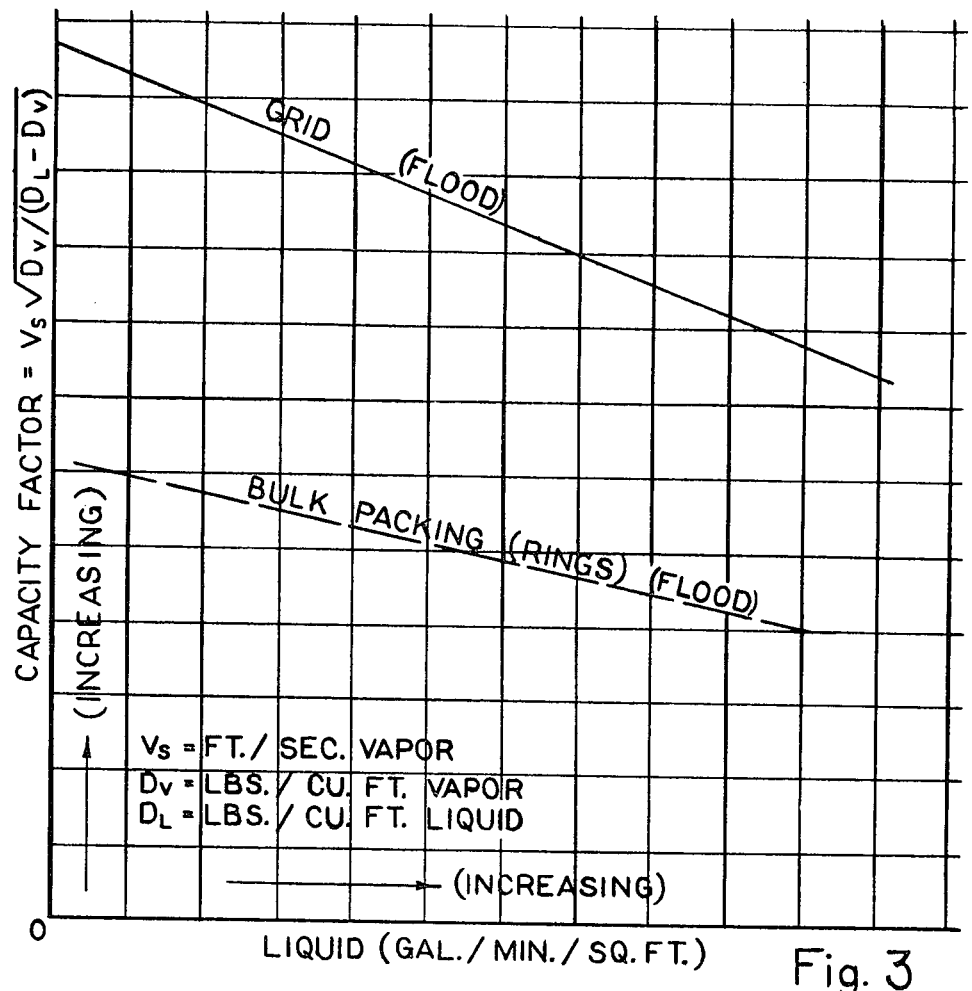
FIG. 3 is a somewhat diagrammatic graph illustrating the relative maximum capacities of vapor-liquid contact grid structures and bulk packing respective to various descending liquid rates in gallons per minute per square foot of area as well as the relative capacity factors thereof.

As is shown in FIG. 3, the flood point or flood line of the grid sections affords a much higher capacity factor than the flood point or flood line of the bulk packing section for a given descending liquid rate. The superficial flow (vapor) rate of the introduced feed stock vapor decreases as it ascends through the composite zone of the tower, as said vapor is condensed by the descending liquid. Because of the controlled turbulence and vapor-liquid contact ability of the grid section, a predetermined or desired per cent of the vapor is condensed through said grid section, depending on the service and requirements as well as the height of said section. Normally, 20 percent to 40 percent of said vapor is condensed by the time it reaches the bulk packing section of the composite zone. The remaining vapor load is well distributed over the area of the tower. At the contiguous interface of the grid and bulk packing sections, the vapor load has decreased to an acceptable value so that the vapor ascends through the bulk packing section without impairing the desired vapor flow rate capacity through the composite zone.

Figure 4:
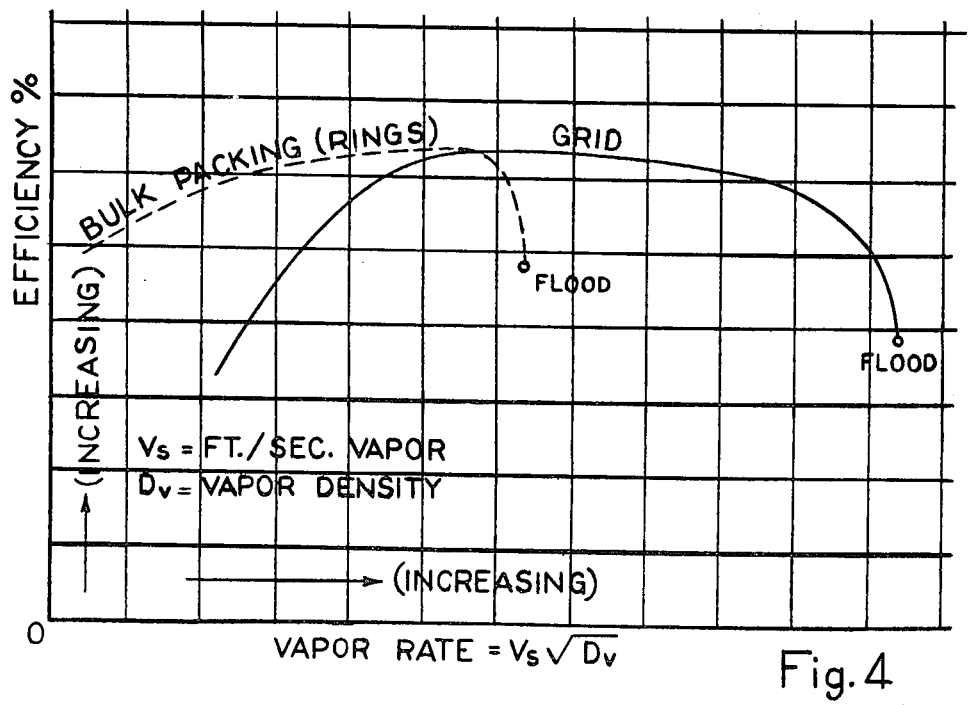
FIG. 4 is a somewhat diagrammatic graph illustrating relative efficiency versus vapor rate.

Curves plotting efficiency versus vapor rate are shown in FIG. 4, wherein the vapor rate is expressed as a function of the superficial vapor velocity times the square root of the vapor density. As illustrated by the respective curves, the grid section maintains uniform and good efficiency when the vapor rates are considerably in excess of the maximum capacity of the bulk packing section; however, when the vapor rate drops to lower values, the efficiency curve of said grid section indicates a drop-off of efficiency. When such lower vapor rates are reached in a given system, the vapor rate or load ascends through the bulk packing section and said section maintains a good efficiency value and is capable of accepting the lower vapor rate load without excessive pressure drop or loss of capacity.

Again referring to FIG. 2, it can be seen that the grid section 24 of the composite zone 20 is self-supporting and has structural ability to accept the weight of the bulk packing material 27. Of course, in large towers, major supports may be required upon which the ends of the grid members rest since such grid members are normally made in self-supporting panels of six to eight feet length. As mentioned hereinbefore, the bulk packing material is adapted to be retained in place by suitable means to prevent its dislodgment in service and maintain a bulk packing section of uniform height. Grid sections and panels may be used for this holddown purpose and to obtain the further advantage of improved distribution of vapor that may have become maldistributed in ascending through the bulk packing section. These grid sections and panels further serve the function of distributing the descending liquid evenly over the top of the bulk packing section. The grid panels are of such configuration that comingling of the bulk packing material within the space occupied by the grid section is minimized and essentially prevented.

As shown in FIG. 1, the spray header 25 is adapted to spray the descending liquid over the holddown grid 29 to ensure proper distribution thereof; and the collector tray 30 is utilized to conduct, accumulate and/or distribute the descending liquid after it has passed through the composite grid and bulk packing zone 20.

VAPOR-LIQUID CONTACT APPARATUS WHEREIN THE SUPERFICIAL FLOW RATE OR MASS OF THE VAPOR INCREASES AS IT ASCENDS THROUGH THE APPARATUS

Figure 5:
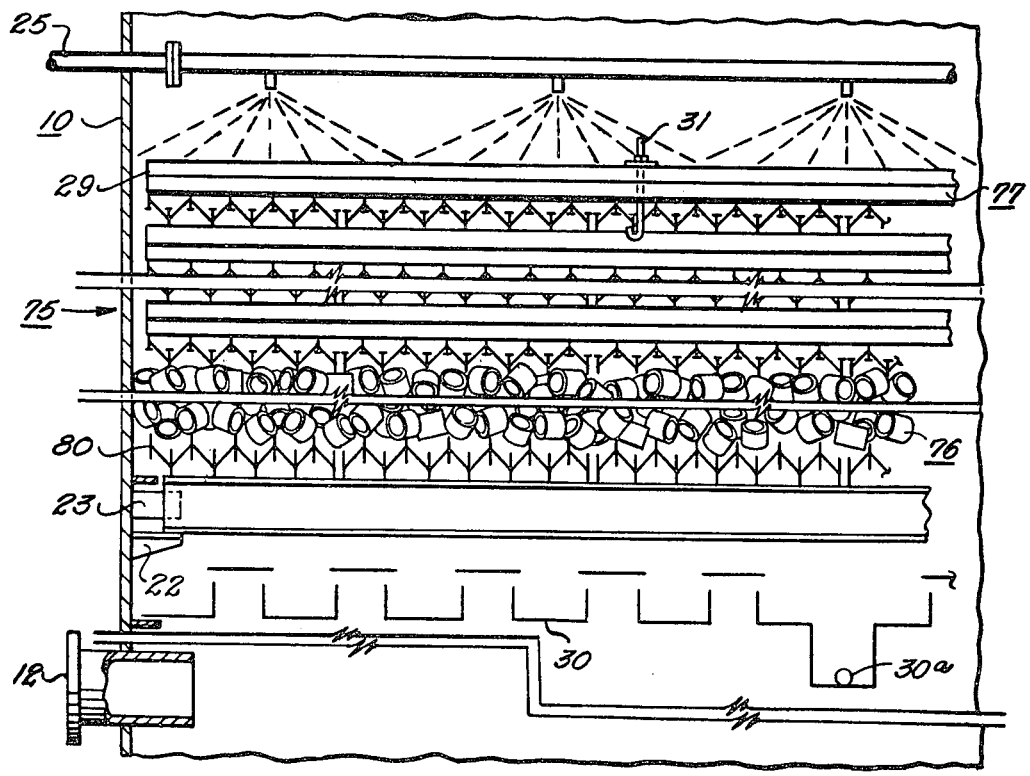
FIG. 5 is a view similar to FIG. 2 and showing a modified composite grid bed and bulk packing zone wherein the grid section overlies the bulk packing section.

In FIG. 5 a bulk packing and grid bed composite zone 75, essentially an inversion of the composite zone 20 shown in FIGS. 1 and 2, is illustrated. It includes a similar grid support 80 upon which a desired height of bulk packing material rests to form a bed or section 76 similar to the bed 27. A similar grid section 77 overlies the bulk packing section 76 in contiguous relationship with said section being of a desired height for proper operation. The remainder of this modified zone is identical to the composite zone 20.

Again, it is noted that for a desired initial vapor feed stock rate the maximum capacity of a grid section or a bulk packing section is determined by plotted curves relative to various descending liquid rates expressed in gallons per minute per square foot of tower area and a capacity factor equal to the superficial vapor velocity times the quotient of the square root of the vapor density divided by the difference in the descending liquid density and said vapor density. As is shown in FIG. 3, the flood point or flood line of the grid section obtains a much higher capacity factor than the flood point or flood line of the bulk packing section of FIG. 5. The superficial vapor rate of the introduced feed stock vapor increases as said vapor ascends through the composite zone that consists of a bed of bulk packing material upon which a bed of grid rests in contiguous relationship.

Although the ascending vapor increases in its rate through the composite zone, the bulk packing material affords sufficient capacity to accept the initial vapor feed stock rate. Throughout the section of the bulk packing material in the composite zone, the efficiency is of a high value and the pressure drop through said section is within acceptable limits. At the point in height of the bulk packing section at which the vapor rate has increased to a value that would impair the capacity of the tower, the contiguous interface between said bulk packing section and the overlying grid section is reached. At this interface, the grid section readily accepts the ever increasing vapor flow rate with good efficiency of component separation and with an improvement of, and certainly no impairment of, the pressure drop through said grid section. It should be pointed out that the grid section further performs the function of eliminating any significant degree of maldistribution of the ascending vapor that may have been created while the ascending vapor was passing through the bulk packing section of the composite zone. Reference is again made to FIG. 4 and the accompanying discussion thereof.

The composite zone comprising a section of bulk packing material and a section of grid is supported by a suitable grid configuration or by suitable panels of the grid construction to support said zone. The supporting grid panels perform the function of even distribution of the ascending vapor before said vapor enters the bulk packing section and, furthermore, the overlying grid section of the composite zone provides a well distributed vapor discharge after said vapor ascends above said zone to minimize the tower height thereabove since the volumetric space above said zone need not be as great as would normally be required for even vapor distribution and uniform discharge pressure drop and stability of operation. Also, the configuration of the composite zone minimizes or essentially prevents comingling of the bulk packing with the grid.

VAPOR-LIQUID CONTACT APPARATUS WHEREIN THE VAPOR MASS REMAINS SUBSTANTIALLY CONSTANT WITHOUT ANY SIGNIFICANT FLUCTUATION AS IT ASCENDS THROUGH THE APPARATUS

Certain process units may be controlled from a capacity standpoint by a significant change in the density of the ascending vapor in the units or in certain zones of said units. For example, the vapor mass may be essentially constant through a zone of a vessel but the vapor volume may be significantly increasing and the vapor density significantly decreasing, resulting in increased kinetic energy of said vapor which the vapor-liquid contact apparatus must handle without loss of capacity and/or efficiency.

Such tower units as described above, may require the use of composite zones having grid and bulk packing in inverted relationship as shown in FIG. 5 to utilize the higher capacity and good distribution qualities of the grid structure.

Manifestly, the invention is not limited to the above specific explanation and illustrations, in which the superficial vapor rate appears to be controlling. At the point of introduction of the feed stock, the ascending vapor for efficient operation must enter the vapor-liquid contact apparatus in a uniformly distributed state with minimum maldistribution to prevent channelling of said ascending vapor and the descending liquid. It should be apparent that excessive maldistribution of the vapor or partial vapor and partial liquid feed stock at the point of entry may create an entrainment problem in connection with the descending liquid through the aforesaid composite zone. The grids, with their distribution characteristics, minimize the amount of entrained liquid that is carried by the ascending vapor and prevents premature flooding.

What is claimed is:

1. A method for effecting vapor-liquid contact reactions between and ascending vapor and a descending liquid in a situation where the process conditions and the nature of the vapor and liquid are such that the vapor rate of the vapor decreases as it ascends, said method comprising:

passing vapor upwardly through a composite vapor-liquid contact zone having two contiguous regions, the lower of said regions having good efficiency at high vapor rates and the upper of said regions having good efficiency at low vapor rates, the interface between said regions being located to encounter ascending vapor having a vapor rate at which the efficiencies of said regions are substantially equal;

passing liquid downwardly through said composite zone to effect contact with vapor ascending therethrough;

and collecting and withdrawing at least part of the liquid passing out of said composite zone;

said lower region being formed of multiple layers of vapor-liquid contact grid, each layer comprising a plurality of relatively narrow elongate vertically oriented flanged ribs extending transversely of the path of fluid flow and generally parallel to one another and at an angle to ribs in other layers, the flanged ribs in a given layer being connected together by connecting means extending therebetween, and the flanges on said ribs extending generally transversely of the path of fluid flow;

and said upper region being formed of randomly oriented bulk packing, said packing being supported by said grid at the interface therebetween.

2. A method for effecting vapor-liquid contact reactions between an ascending vapor and a descending liquid in a situation where the process conditions and the nature of the vapor and liquid are such that the vapor rate of the vapor increases as it ascends, said method comprising:

passing vapor upwardly through a composite vapor-liquid contact zone having two contiguous regions, the lower of said regions having good efficiency at low vapor rates and the upper of said regions having good efficiency at high vapor rates, the interface between said regions being located to encounter ascending vapor having a vapor rate at which the efficiencies of said regions are substantially equal;

passing liquid downwardly through said composite zone to effect contact with vapor ascending therethrough;

and collecting and withdrawing at least part of the liquid passing out of said composite zone;

said upper region being formed of multiple layers of vapor-liquid contact grid each layer comprising a plurality of relatively narrow elongate vertically oriented flanged ribs extending transversely of the path of fluid flow and generally parallel to one another and at an angle to ribs in other layers, the flanged ribs in a given layer being connected together by connecting means extending therebetween, and the flanges on said ribs extending generally transversely of the path of fluid flow;

and said lower region being formed of randomly oriented bulk packing, said vapor-liquid contact grid being supported by said bulk packing at the interface therebetween.

\* \* \* \* \*